United States Patent [19]

Malinowski et al.

[11] 4,015,509
[45] Apr. 5, 1977

[54] METHOD AND APPARATUS FOR SHAPING AN AIRFOIL

[75] Inventors: Eugene J. Malinowski, Richmond Heights; Raymond J. Zyck, Willowick, both of Ohio

[73] Assignee: TRW Inc., Cleveland, Ohio

[22] Filed: Oct. 23, 1974

[21] Appl. No.: 517,388

[52] U.S. Cl. .............................. 90/13.5; 90/13 R; 90/15 R

[51] Int. Cl.² ...................... B23C 1/16; B23C 1/00

[58] Field of Search ............. 90/11.44, 11.6, 11.62, 90/13.3, 13.6, 13.7, 13.5; 51/100 R, 34 A, 48 HE, 37; 29/156.8 B, 156.8 P

[56] References Cited
UNITED STATES PATENTS

| | | | |
|---|---|---|---|
| 1,769,870 | 7/1930 | Traud | 51/48 HE X |
| 2,286,970 | 6/1942 | Maynard | 51/48 HE |
| 2,429,324 | 10/1947 | Meisser | 90/13.7 X |
| 2,656,651 | 10/1953 | Seyferth | 51/37 UX |
| 3,162,987 | 12/1964 | Cronin et al. | 51/100 R X |

Primary Examiner—Harrison L. Hinson

[57] ABSTRACT

An improved method and apparatus are utilized to shape the leading and trailing edges of a tapered airfoil having twisted and bowed major side surfaces. To compensate for taper, a rotatable forming tool is moved inwardly toward the longitudinal axis of the airfoil as the tool is moved through a working stroke along an edge of the airfoil. To compensate for the bowed side surfaces, the forming tool is pivoted in such a manner as to maintain its axis of rotation perpendicular to an arcuately curved edge being shaped by the tool. To compensate for twist, the airfoil is rotated about its central axis to maintain a major side surface of the airfoil in abutting engagement with a positioning or locating roller disposed adjacent to the edge forming tool. The locating roller rolls along a major side surface of the airfoil to position the edge portion of the airfoil and the forming tool relative to each other as the forming tool moves along the twisted edge.

32 Claims, 8 Drawing Figures

METHOD AND APPARATUS FOR SHAPING AN AIRFOIL

BACKGROUND OF THE INVENTION

This invention relates generally to a method and apparatus for shaping airfoils and more specifically to a method and apparatus for shaping the leading and/or trailing edge portions of an airfoil of the type utilized in turbines, compressors and similar fluid-flow devices.

The leading and trailing edge portions of airfoils which are utilized in gas turbine engines have previously been finished by hand grinding or other manual finishing methods. These manual finishing methods are relatively inaccurate and it is extremely difficult, if not impossible, to hold the radius of curvature of an airfoil edge to a very small tolerance. Since the operating efficiency of a turbine engine is enhanced if the leading and trailing edges are accurately finished to relatively small tolerances, more than two hours have been previously been required to hand shape the leading and trailing edge portions of a turbine blade.

In order to expedite the construction of an airfoil, known prior art patents have disclosed various types of machines and methods for shaping either or both the leading and trailing edge portions of an airfoil. Some of these known airfoil finishing apparatus and methods are disclosed in U.S. Pat. Nos. 2,681,500; 2,680,392; and 2,336,303. For example, U.S. Pat. No. 2,680,392 discloses an apparatus for swaging the edge portion of an airfoil. However, this apparatus cannot be utilized to compensate for either bow or twist in the edge portion of the airfoil. If a cutting or milling toll was utilized in place of the swaging tool of this known apparatus, the cutting tool would not follow the contour of the edge of the blade in such a manner as to provide an accurately shaped blade.

SUMMARY OF THE PRESENT INVENTION

The present invention provides an improved method and apparatus which can be utilized to shape the leading and/or trailing edge of a longitudinally tapered airfoil having twisted and bowed major side surfaces. The apparatus includes a rotatable forming tool which is moved along a longitudinally extending edge of the airfoil. In order to compensate for longitudinal taper of the airfoil, the distance between the forming tool and central axis of the airfoil is varied as the forming tool moves along the edge of the airfoil. Thus, if the forming tool is being moved from a relatively wide chord width at the tip toward a relatively narrow chord width at the root of the airfoil, the forming tool is moved toward the central axis of the airfoil. This inward movement may be obtained by utilizing a longitudinally extending cam having a surface which corresponds to the desired movement of the forming tool relative to the central axis of the airfoil.

When the airfoil has an arcuately bowed and configuration, it is necessary to compensate for this bowed configuration as the forming tool moves along the edge of the airfoil. This may be accomplished by pivoting the forming tool about an axis extending perpendicular to its axis of rotation so as to maintain the axis of rotation of the forming tool perpendicular to the arcuately curved edge of the airfoil as the forming tool is moved through a working stroke. The axis of rotation of the forming tool is advantageously maintained perpendicular to the edge portion of the airfoil by a longitudinally extending cam which is engaged by a follower. This follower effects pivotal movement of the forming tool as the arc of curvature of the bowed edge of the airfoil changes to thereby maintain the axis of rotation of the forming tool perpendicular to the edge of the airfoil.

When the edge of an airfoil having twisted major side surfaces is being formed, it is necessary to compensate for the twist of the side surfaces by effecting relative movement between the airfoil and the forming tool in a direction transverse to the edge of the airfoil. This may be accomplished by rotating the airfoil about its central longitudinal axis. In one specific embodiment of the invention, the airfoil is rotated about its central axis by a torque motor which is effective to press a major side surface of the airfoil against a locating surface. The locating surface is moved along the airfoil with the forming tool and is effective to position the forming tool relative to the edge of the airfoil.

In compensating for twist, the locating surface is advantageously moved transversely to the longitudinal central axis of the airfoil as the airfoil is rotated about its central axis. This facilitates positioning of the forming tool in the desired relationship to the edge portion of the airfoil. This movement of the locating surface may be accomplished by the use of a longitudinally extending cam which cooperates with a follower to effect movement of the forming tool and locating surface toward or away from the central axis of the airfoil.

Accordingly, it is an object of this invention to provide a new an improved apparatus and method for use in shaping an airfoil having an arcuately bowed edge and wherein the central axis of a rotatable forming tool is maintained perpendicular to the bowed edge as the forming tool is moved through a working stroke along the edge.

Another object of this invention is to provide a new and improved method and apparatus for use in shaping an airfoil having twisted major side surfaces and wherein the airfoil is rotated about a central axis to maintain an edge of the airfoil in engagement with a forming tool as the tool moves through a working stroke.

Another object of this invention is to provide a new and improved method and apparatus for shaping an edge of an airfoil and wherein a locating surface is moved along a major side surface of the airfoil to position the edge of the airfoil and a forming tool relative to each other.

BRIEF DESCRIPTION OF THE DRAWINGS

The foregoing and other objects and features of the present invention will become more apparent upon a consideration of the following description taken in connection with the accompanying drawings wherein.

DESCRIPTION OF ONE SPECIFIC PREFERRED EMBODIMENT OF THE INVENTION

Figure 1:
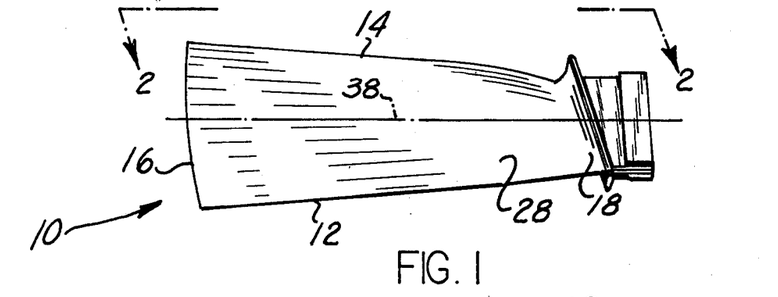
FIG. 1 is a schematic illustration depicting an airfoil having a longitudinally tapered configuration.

An airfoil 10 is illustrated in FIG. 1 and has a leading edge 12 and a trailing edge 14. The edges 12 and 14 extend between a relatively wide tip end portion 16 and narrow root end portion 18 of the airfoil. Both the leading and trailing edges 12 and 14 of the airfoil have a bowed configuration. Thus, the trailing edge 14 is arcuately bowed outwardly from a straight line or axis 22 (see FIG. 2) extending between the tip and root end portions 16 and 18. The leading edge 12 of the airfoil 10 has an arcuately bowed configuration similar to the configuration of the trailing edge 14.

Figure 2:
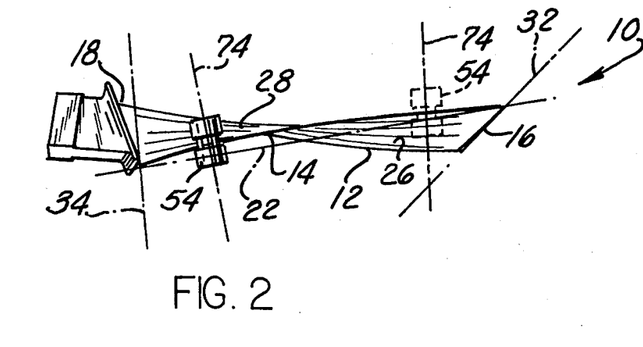
FIG. 2 is an elevational view, taken generally along the line 2—2 of FIG. 1, illustrating the bowed and twisted configuration of major side sufaces of the airfoil.

The major side surfaces 26 and 28 of the airfoil 10 are twisted (FIG. 2). An axis 32 at the tip of the airfoil 10 extends perpendicular to the leading and trailing edges 12 and 14 of the airfoil. The axis 32 is offset angularly from an axis 34 extending perpendicular to the leading and trailing edges 12 and 14 of the airfoil at the root 18 of the airfoil. Of course, the extent to which the axes 32 and 34 are angularly offset relative to each other is determined by the extent to which the major side surfaces 26 and 28 of the airfoil are twisted about a longitudinally extending central axis 38 (see FIG. 1) of the airfoil 10.

Figure 3:
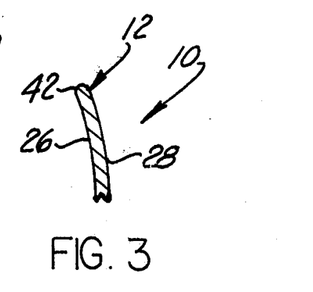
FIG. 3 is a fragmentary sectional view depicting the manner in which an edge portion of the airfoil of FIGS. 1 and 2 is shaped.

The leading edge 12 of the airfoil 10 has a smoothly curved cross-sectional configuration (see FIG. 3). Thus, the leading edge 12 has a curved outer surface 42 which extends into a smooth tangential intersection with a concave major side surface 26 of the airfoil 10. The intersection between the curved outer surface 42 and a convex major side surface 28 of the airfoil 10 is slightly discontinuous. The obtaining of a smooth intersection between the concave major side surface 26 and the curved surface of the leading end portion 12 of the airfoil 10 is important if an associated turbine is to have optimum operating characteristics. The slight discontinuity between the surface 42 and convex major side surface 28 has little or no effect on the operating characteristics of a turbine with which the blade 10 is associated.

In accordance with the present invention, an airfoil milling machine 50 (FIG. 4) is utilized to shape the leading and trailing edges 12 and 14 of the airfoil 10. Heretofore, the leading and trailing edges of relatively long airfoils were hand shaped. The shaping of the leading and trailing edges of one known relatively long turbine blade required approximately two hours of careful hard work. By utilizing the milling machine 50, the leading and trailing edges of a similar turbine blade can be shaped in approximately 12 minutes. In addition, the milling machine 50 is capable of shaping the leading and trailing edges of a turbine blade to a closer tolerance than could be obtained by hand methods. As is well known to those skilled in the art, the operating characteristics of a turbine can be improved substantially by increasing the accuracy with which the leading and trailing edges of a turbine blade are shaped.

The airfoil milling machine 50 includes a forming or milling tool 54 having a plurality of radially outwardly projecting cutting teeth 56 which are disposed in an annular array on a body portion of the forming tool. As the forming tool 54 is moved through a working stroke along a path extending between the tip and root end portions 16 and 18 of the turbine blade 10, a vertical or taper cam 60 cooperates with a follower 62 (see FIGS. 4 and 5) to move the forming tool 54 in such a manner as to compensate for the longitudinal taper of the airfoil 10. The cam 60 has a length which is somewhat greater than the length of the airfoil edge 12. The cam 60 is shaped so as to move the forming tool 54 vertically with tapering of the leading edge 12 relative to the horizontal central axis 38 of the airfoil 10.

As the forming tool 54 is moved along the leading edge 12 of the airfoil 10, a longitudinally extending bow cam 66 cooperates with a cam follower 68 (see FIGS. 5 and 6) to effect pivotal movement of the forming tool 54 about a vertical axis 72 (FIG. 5) which intersects a horizontal axis 74 of rotation of the forming tool. The cam 66 is longer than the airfoil 10 and has a configuration such that the forming tool 54 is pivoted about the vertical axis 72 to maintain the axis 74 of rotation of the forming tool perpendicular to the arcuately bowed leading edge 12 of the turbine blade 10. This is illustrated schematically in FIG. 2 wherein the forming tool 54 is shown in dashed lines adjacent to the tip end 16 of the turbine blade 10 and is shown in solid lines adjacent to the root end 18 of the turbine blade. As the forming tool moves between the tip and root end portions of the airfoil 10, the central axis 74 of the rotating forming tool 54 is maintained in a perpendicular relationship with a central axis of the arcuately bowed leading edge 12.

The forming tool 54 is rotated at a relatively high speed by a drive motor 76 (FIG. 5) connected with the forming tool 54 by a tool support and drive collet or chuck 77. If the central axis 74 about which the forming tool or cutting head 54 rotates is not maintained in a perpendicular relationship with the arcuately bowed central axis of the leading edge portion 12 in the manner shown schematically in FIG. 2, the circular arrays of generally radially projecting teeth 56 on the rotating forming or milling tool 54 would nick or gouge the airfoil 10. Of course, the resulting discontinuity in the edge of the blade would impair the operating characteristics of any machine with which the airfoil is used.

Figure 7:
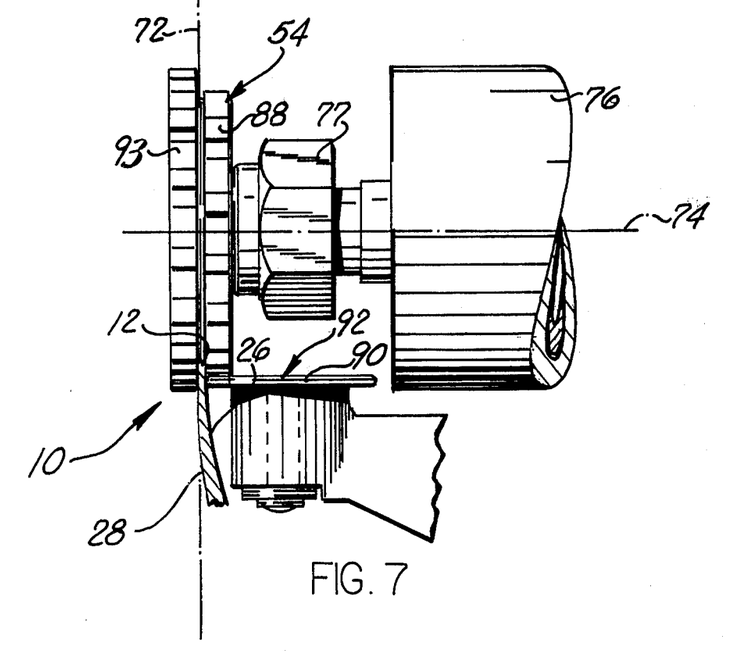
FIG. 7 (on sheet 1 of the drawings) is an enlarged fragmentary view illustrating the relationship between a cutting or milling tool and a leading edge of an airfoil being shaped by the cutting tool.

Since the major side surfaces 26 and 28 of the airfoil 10 are twisted about the central axis 38, it is necessary to rotate the airfoil about its horizontal central axis to maintain the edge portion 12 of the airfoil in the desired machining orientation shown in FIG. 7. When the airfoil 10 is in the desired machining orientation, the leading edge 12 of the airfoil is centered relative to the forming tool 54 (FIG. 7) and the vertical axis 72 extends through the center of the portion of the leading edge 12 engaged by the forming tool. To facilitate rotational movement of the airfoil 10 about its central axis 38, the tip portion 16 of the airfoil is mounted in a rotatable tailstock 80 and a root end portion 18 of the airfoil is engaged by a rotatable headstock 82. A fluid pressure actuated torque motor 84 is connected to the headstock 82 and continuously urges the headstock 82 to rotate the airfoil about its horizontal central axis 38 in the direction of the arrow 86 in FIG. 4.

The continuous biasing force applied to the headstock 82 by the torque motor 84 presses the concave major side surface 26 of the airfoil against a circular positioning or locating surface 90 (see FIG. 7) on a rotatable roller or disc 92. The roller 92 is mounted for rotation about a vertical axis which is parallel to and spaced apart from the axis 72. The circular outer surface 90 of the roller 92 engages the major side surface 26 of the airfoil immediately beneath the forming tool 54. A line of rolling engagement of the locating surface 90 with the surface is always disposed in a flat plane containing the axes 72 and 74.

A cam follower 94 (FIGS. 5 and 6) engages a twist or roll cam 96 to effect horizontal movement of a feed table 98 to position the locating roller 92 in such a manner that the leading edge 12 of the airfoil 10 is always centered relative to the forming tool 54 as the forming tool is moved. along the leading edge. Of course, the cam 96, like the cams 60 and 66, has a length which is greater than the length of the airfoil 10.

Figure 4:
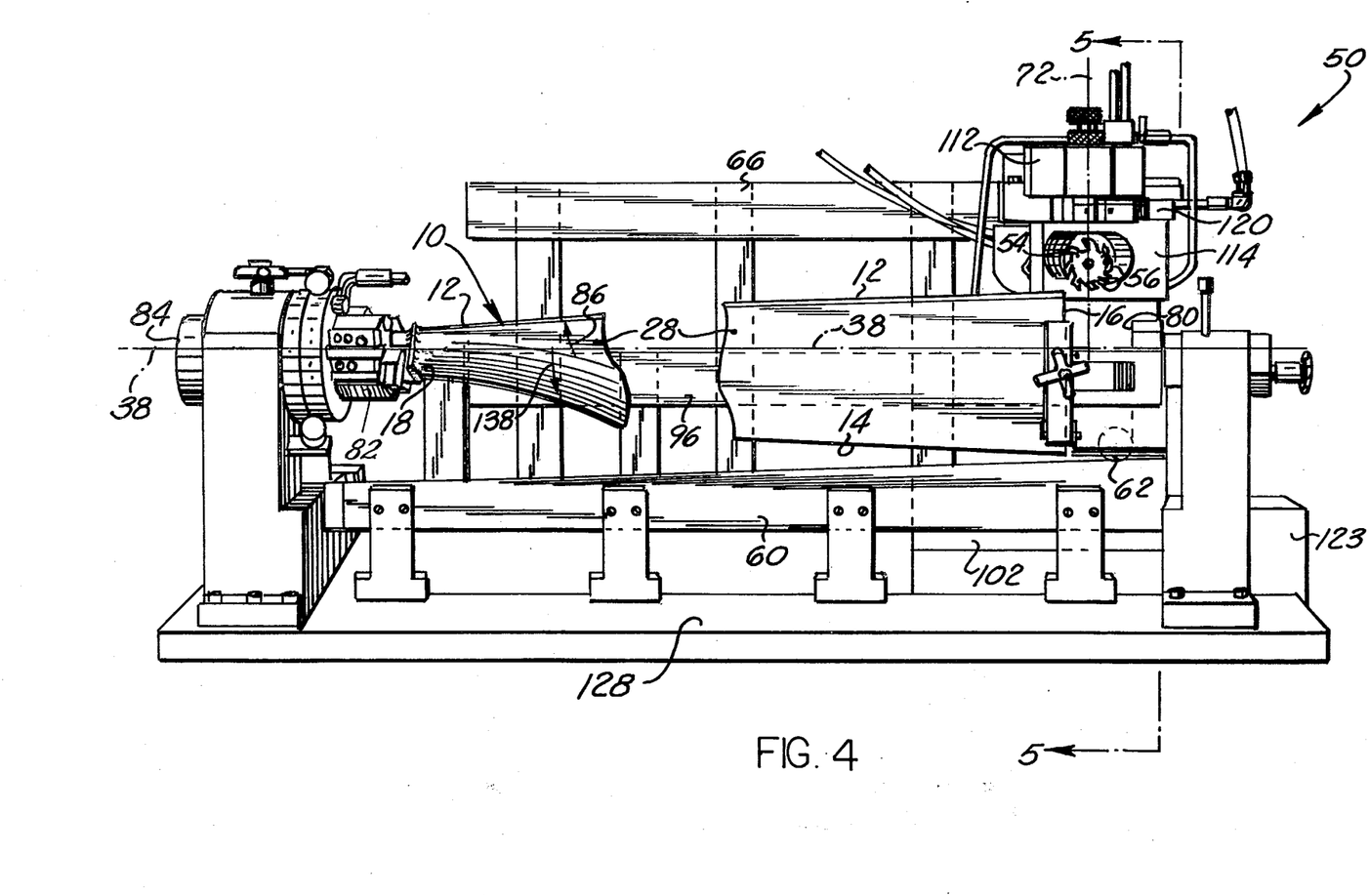
FIG. 4 is a pictorial illustration of an airfoil milling machine constructed in accordance with the present invention.

When the leading edge 12 of the airfoil 10 is to be shaped to a desired cross sectional configuration, such as shown in FIG. 3, the tip end 16 of the airfoil is gripped by the tailstock 80 while the root end 18 of the airfoil is supported by the headstock 82. At this time, the cutting tool 54 is axially spaced from the tip end 16 of the airfoil (as shown in FIG. 4). The leading edge 12 of the airfoil 10 is then manually moved into alignment with the cutting tool 54 (as shown in FIG. 7).

When the cutting tool 54 has been aligned with leading edge 12, the concave major surface 26 of the airfoil 10 is pressed against the roller 92 under the influence of the torque motor 84. The roller 92 centers the airfoil relative to the forming tool 54 so that the axially inner set of teeth 88 on the cutting tool 54 extend into a smooth tangential engagement with the concave major surface 26 of the airfoil 10. An outer set of teeth 93 on the forming tool 54 engage the convex major side surface 28 of the airfoil 10. The leading edge 12 can then be shaped to a smooth arcuate configuration, such as shown in FIG. 3, by the profile of the portions of the cutting teeth which extend between the inner and outer sets of teeth 88 and 90.

Figure 5:
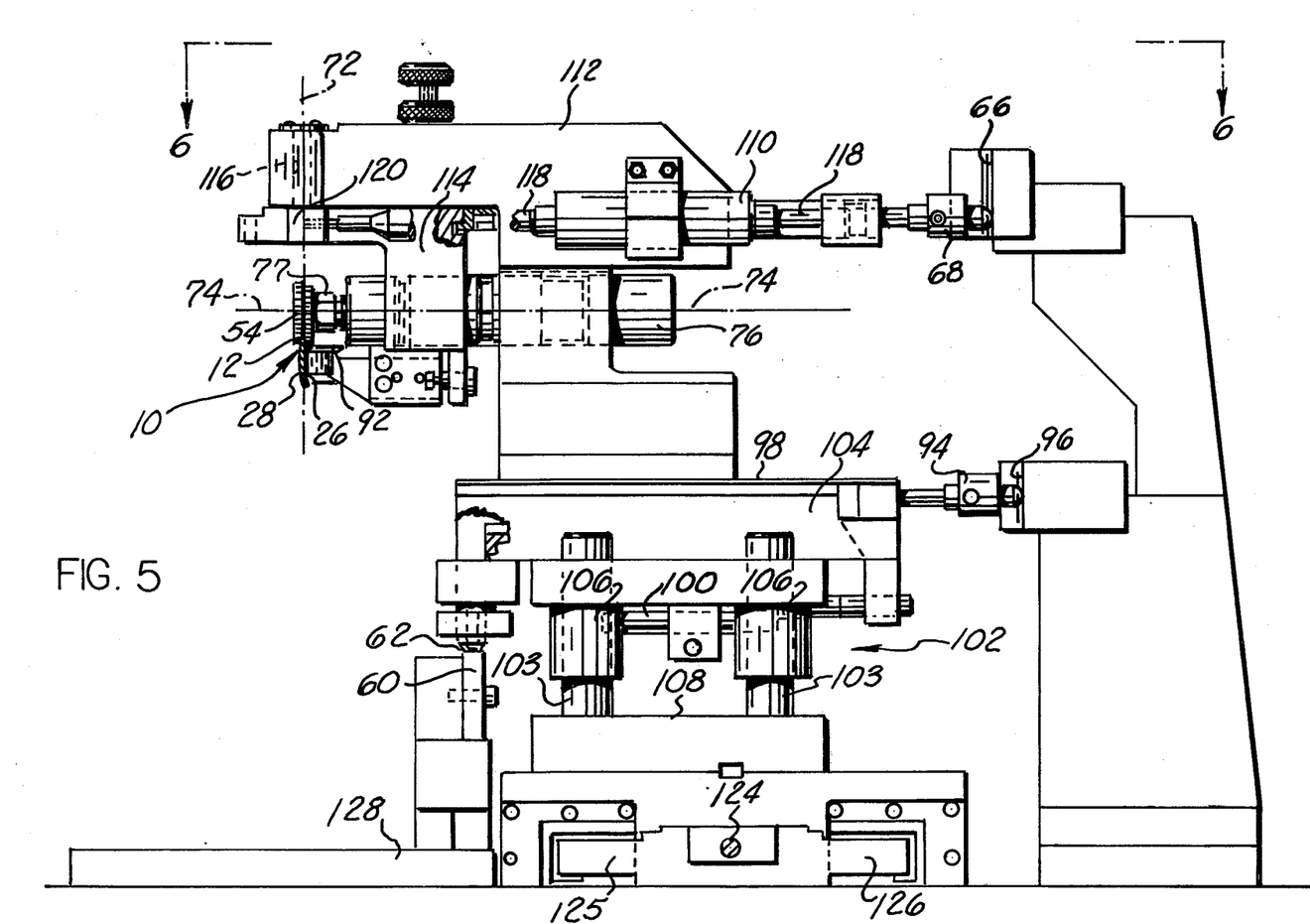
FIG. 5 is an elevational view, taken generally along the line 5—5 of FIG. 4, illustrating the relationship between a forming tool and a plurality of longitudinally extending cams which effect movement of the forming tool in such a manner as to compensate for the tapered, bowed and twisted configuration of the airfoil.
Figure 6:
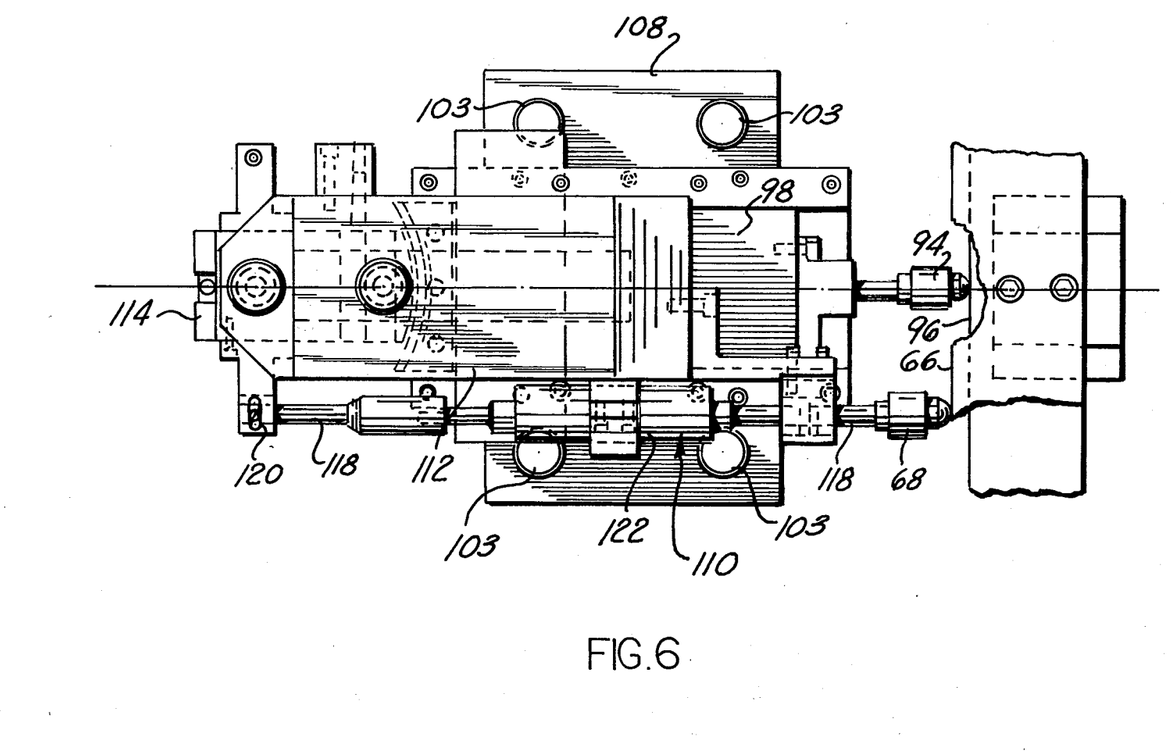
FIG. 6 is a plan view, taken generally along the line 6—6 of FIG. 5, further illustrating the construction of the airfoil milling machine.

The cam 96 is shaped to effect horizontal movement of the follower 94 and roller 92 to maintain the cutting tool 54 centered relative to the twisted edge 12 of the airfoil 10 as the cutting tool is moved along the edge 12. The cam follower 94 is mounted on a feed table 98 (FIG. 5). The feed table 98 is reciprocated along a horizontal path toward and away from the horizontal central axis 38 of the airfoil 10 by the interaction between the cam 96 and follower 94 as the forming tool 54 is moved through a working stroke along the edge 12 of the airfoil 10. As the forming tool 54 moves through a working stroke, the locating roller 92 rolls along the surface 26 of airfoil 10. When this is occurring, the follower 94 is continuously pressed against the cam 96 by a piston and cylinder assembly 100 connected with the feed table 98 and a slide assembly 102.

As the forming tool 54 is moved through a working stroke along the leading edge 12 of the airfoil 10, the vertical or taper cam 60 cooperates with the follower 62 to actuate the slide assembly 102 (FIG. 5) to position the feed table 98 vertically. The side assembly 102 includes vertical posts 103 on which a feed table guide section 104 of the slide assembly is slidably mounted by ball bushings 106 and held downwardly against the cam 60 by gravity. Therefore, the roller 62 is continuously pressed against the vertical or taper cam 60 and the vertical position of the feed table 98 and forming tool 54 is regulated by the taper cam 60. Two piston and cylinder assemblies (not shown but similar to the piston and cylinder assembly 100) are connected between the feed table guide section 104 and a taper cam 60 upon command to raise the assembly and disengage the forming tool 54 in the return stroke.

At this time the forming tool 54 is positioned with the horizontal axis 74 of rotation of the forming tool 54 extending perpendicular to a central longitudinal axis of the arcuately bowed edge portion 12 of the airfoil 10 by the cooperation between the cam follower 68 and the cam 66. The cam follower 68 is continuously pressed against the cam 66 by a piston and cylinder assembly 110 (FIG. 6) which is mounted on an upstanding support section 112. A forming tool support bracket 114 (FIG. 5) is pivotally connected at 116 with the support section 112 for rotation about the vertical axis 72. The forming tool drive motor 76 is mounted on the bracket 114 and moves with the bracket as the forming tool 54 is pivoted about the axis 72. An actuator rod or shaft 118 extends through the piston and cylinder assembly 110 and is connected at one end with the cam follower 68. The other end of the actuator rod 118 is pivotally connected with an outwardly projecting arm 120 on the support bracket 114 (see FIGS. 5 and 6). The actuator rod 118 is connected with a piston 110 and is anchored in position by clamp bracket 122 so that air pressure on the piston continuously presses the cam follower 68 against the cam 66.

When the forming tool 54 has been oriented in alignment with the leading edge 12 of the airfoil 10 in the manner shown in FIG. 7, a drive motor 123 (FIG. 4) is energized to rotate a longitudinally extending lead screw 124 (FIG. 5) which moves the slide assembly 102 along linear horizontal ways 125 and 126 adjacent to a base 128. As the slide assembly 102 is moved along the longitudinal ways 125 and 126, the forming tool 54 moves along a longitudinally extending path adjacent to the leading edge 12 of the airfoil 10. As the forming tool 54 moves along this path through a work stroke, the taper cam 60 and cam follower 62 cooperate with the slide assembly 102 to move the feed table 98 vertically to compensate for the longitudinal taper of the airfoil 10. Although the work stroke could be in either direction, the work stroke is from the relatively wide tip end portion 16 of the airfoil 10 toward the relatively narrow root end portion 18 of the airfoil. Therefor, cam 60 slopes downwardly so that the cutting tool 54 is moved inwardly toward the central axis 38 of the airfoil 10 as the cutting tool 54 moves along the leading edge 12.

Simultaneously with this vertical movement of the cutting tool 54 to compensate for the tapered configuration of the airfoil 10, the cutting tool 54 is pivoted about the vertical axis 72 under the influence of the cam 66 to maintain the axis 74 of rotation of the cutting tool perpendicular to an arcuately curved central axis of the bowed leading edge 12 of the airfoil 10. Thus as the cutting tool 54 is moved through a work stroke along the leading edge 12 of the airfoil, the cam 66 moves the cam follower 68 to pivot the forming tool and motor support mounting 114 about the pivot connection 116 which is coaxial with the vertical axis 72. The cam 66 has a configuration such that the horizontal central axis 74 of the forming tool 54 is maintained perpendicular to the arcuately bowed longitudinal central axis of the leading edge portion 12. It should be noted that the cams 66 and 96 have vertical extents sufficient to accommodate vertical movement of the associated followers 68 and 94 upon movement of the feed table 98 under the influence of the taper cam 60.

During the pivotal movement of the forming tool 54 about the vertical axis 72 under the influence of the cam 66 and forming tool 54 due to the action of the cam 60, the forming tool is moved in and out with the locating roller 92. This movement of the forming tool 54 and locating roller 92 under the influence of the cam 96 is along a horizontal path in a direction perpendicular to the axis 38. This moves the positioning or locating roller 92 to compensate for the twisted configuration of the airfoil 10.

As the locating roller 92 is moved in and out under the influence of the cam 96, the torque motor 84 is continuously attempting to rotate the airfoil 10 about its horizontal central axis 38 to press the concave major side surface 26 of the airfoil against the locating roller 92. This maintains the leading edge 12 of the airfoil in a centered relationship with the two annular arrays 88 and 93 of radially projecting teeth on the cutting tool 54 (see FIG. 7) as the cutting tool is moved through a work stroke along the leading edge 12 of the airfoil 10. During the work stroke, the positioning roller 92 rolls along the major side surface of the airfoil 10 to maintain the desired spatial relationship between the forming tool 54 and the airfoil. Thus, the forming tool 54 and the leading edge 12 of the airfoil 10 are positioned transversely relative to each other by the locating roller 92 which rolls along the concave major side surface 26 of the airfoil.

After the leading edge 12 of the airfoil 10 has been shaped to the desired configuration by a single work stroke of the cutting tool 54 in the manner previously explained, the trailing edge 14 of the airfoil is shaped to the desired configuration. In order to enhance the operating characteristics of a gas turbine engine with which the airfoil 10 is to be associated, it is necessary to provide an extremely smooth line of intersection between the concave major side surface 26 of the airfoil 10 and the rounded surface which defines the exterior of the trailing edge portion. Therefore, it is necessary to center the trailing edge 14 of the airfoil 10 relative to a forming tool by engaging the concave major side surface 26 of the airfoil with the locating or positioning roller 92 adjacent to the trailing edge portion 14 of the airfoil.

To center the trailing edge 14 relative to a trailing edge forming tool 54a (FIG. 8), the locating roller 92 is mounted on an arm 136 which extends outwardly from the motor support bracket 114. The trailing edge forming tool 54a has two annular arrays 88a and 93a of generally radially projecting cutting teeth. Since the forming roller 92 is disposed outwardly of the concave inner surface 26 of the airfoil 10, the direction of operation of the torque motor 84 is reversed so that the torque motor rotates the airfoil 10 about the central horizontal axis 38 in the direction of the arrow 138 in FIG. 4. Thereafter, the torque motor 84 presses the concave major side surface 26 of the airfoil 10 leftwardly (as viewed in FIG. 8) against the circular exterior surface of the roller 92.

Figure 8:
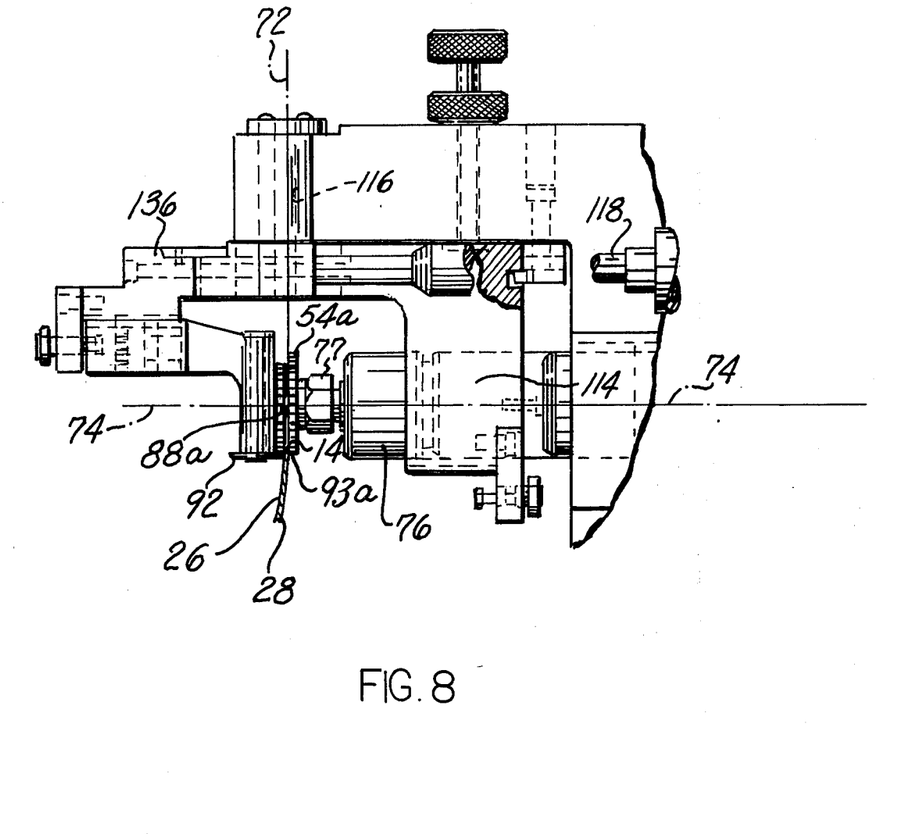
FIG. 8 is a fragmentary sectional view, generally similar to FIG. 7 but on a somewhat smaller scale, illustrating the relationship between a forming or milling tool and the trailing edge of a turbine blade being shaped by the forming tool.

The vertical cam 60, bow cam 66 and twist cams 96 are replaced with suitable cams corresponding to the configuration of the trailing edge portion 14 of the airfoil 10. The milling machine 50 is then operated in the manner previously explained in connection with the shaping of the leading edge portion 12 of the airfoil 10 to shape the trailing edge portion 14 of the airfoil. It should be noted that during the shaping of the trailing edge portion 14 of the airfoil the cams 60, 66 and 96 cooperate with the cam followers 62, 68 and 94 in the same manner as previously explained in connection with the shaping of the leading edge 12 of the airfoil 10. However, the torque motor 84 tends to rotate the airfoil 10 in the opposite direction about the central axis 38 to thereby press the concave inner surface 26 of the airfoil against the forming roller 92 which is now disposed on the outside of the airfoil 10 as shown in FIG. 8.

In view of the foregoing description it can be seen that the airfoil milling machine 50 can be utilized to finish the leading and trailing edges 12 and 14 of an axially tapered airfoil having twisted and bowed major side surfaces 26 and 28. To compensate for the axially tapered configuration of the airfoil 10, the cam 60 effects vertical movement of the feed table 98 to move the forming tool toward and/or away from the horizontal central axis 38 of the airfoil 10 as the forming tool is moved through a working stroke along the edge of the airfoil. The bowed configuration of the major side surfaces 26 and 28 of the airfoil 10 is compensated for by pivoting the forming tool about a vertical axis 72 which is disposed in a plane extending through the center of the edge portion being finished by the milling machine. The forming tool 54 is pivoted about the axis 72 in such a manner as to maintain the axis of rotation 74 of the forming tool perpendicular to the portion of the airfoil edge being engaged by the forming tool at any given time as the forming tool moves through a working stroke along the edge of the airfoil. In order to compensate for the twisted configuration of the major side surfaces 26 and 28 of the airfoil, the airfoil is rotated about its central axis 38 under the influence of a torque motor 84 to maintain the concave major side surface 26 of the airfoil in abutting engagement with a locating roller 92.

When the major side surface 26 of the airfoil 10 is in engagement with the locating roller 92, the airfoil edge portion being shaped is centered between the two sets of teeth 88 and 90 of the forming tool 54. As the forming tool 54 moves along the edge of the airfoil being shaped, the locating roller 92 is moved with forming tool 54 so that the circular surface 90 is disposed in rolling engagement with the concave surface 26 of the airfoil 10 at a point disposed immediately below the cutting teeth 88a. The roller 92 is moved transversely to the edge of the airfoil by the cam 96 to maintain a smooth tangential intersection between the teeth on the forming tool and the concave major side surface 26 of the airfoil 10. It should be noted that if the forming tool is not moved transversely to the edge of the airfoil in the manner accomplished by the cam 96, the central axis of the edge portion being finished by the forming tool would become skewed relative to the axis 72 so that there would no longer be a smooth intersection between the teeth of the forming tool and the concave major side surface 26 of the airfoil.

Although the forming tool 54 has been described herein as being moved under the influence of the cams 60, 66 and 96 to compensate for the tapered, bowed and twisted configuration of the airfoil 10, it is contemplated that the forming tool can be moved under the influence of other known devices. For example it is contemplated that numerical controls could be utilized to effect movement of the forming tool under the influence of various servomotors in accordance with a prerecorded program. It should also be noted that although the forming tool 54 has been disclosed herein as being a milling cutter of the arbor type, other types of known forming tools could be utilized if desired. While the airfoil milling machine 50 is capable of shaping an airfoil 10 having a tapered, bowed and twisted configuration, it is contemplated that the airfoil milling machine could be utilized to shape the edges of an airfoil having only one or two of these configurations. For example, the airfoil milling machine 50 could be utilized to shape the leading and trailing edges of an airfoil having a twisted and tapered configuration or to shape the leading or trailing edges of an airfoil having a bowed configuration.

Having described a specific preferred embodiment of the invention, the following is claimed:

1. An apparatus for use in shaping an airfoil having major side surfaces interconnected by an arcuately bowed and longitudinally extending edge portion which bows transversely to the major side surfaces, said apparatus comprising a rotatable forming tool, means for supporting said forming tool for rotation about its central axis, means for providing for engagement of said forming tool with the arcuately bowed edge portion of the airfoil throughout the length of the arcuately bowed edge portion by effecting relative movement between said forming tool and airfoil while maintaining said forming tool in engagement with the arcuately bowed edge portion of the airfoil, and means for maintaining the central axis of said forming tool in the same angular orientation relative to an arcuately bowed longitudinal central axis of the edge portion of the airfoil during engagement of said forming tool with the arcuately bowed edge portion of the airfoil throughout the length of the arcuately bowed edge portion of the airfoil, said means for maintaining the central axis of the forming tool in the same angular orientation relative to an arcuately bowed longitudinal axis of the edge portion of the airfoil including means for varying the angular orientation of the central axis of the forming tool relative to a straight line extending between opposite ends of the arcuately bowed edge portion of the airfoil during relative movement between said forming tool and the arcuately bowed edge portion of the airfoil.

2. An apparatus as set forth in claim 1 wherein said means for varying the angular orientation of the central axis of said forming tool includes means for moving said forming tool about a secondary axis extending transversely to the central axis of said forming tool to change the angular orientation of the central axis of said forming tool relative to the straight line extending between opposite ends of the arcuately bowed edge portion of the airfoil and thereby maintain the same angular orientation between the central axis of said forming tool and the arcuately bowed longitudinal axis of the edge portion of the airfoil during relative movement between said forming tool and the arcuately bowed edge portion of the airfoil.

3. An apparatus as set forth in claim 2 further including positioning means for engaging a major side surface of the airfoil at a location adjacent to said forming tool, said positioning means including an arcuate positioning surface which is spaced apart from said secondary axis and which has a central axis extending parallel to said secondary axis.

4. An apparatus as set forth in claim 3 further including means for urging the major side surface of the airfoil into abutting engagement with said arcuate positioning surface.

5. An apparatus as set forth in claim 1 wherein said means for varying the angular orientation of the central axis of said forming tool includes means for moving said forming tool about a secondary axis extending perpendicular to the central axis of said forming tool to maintain the central axis of said forming tool perpendicular to the arcuately bowed longitudinal axis of the edge portion of the airfoil during relative movement between said forming tool and the arcuately bowed edge portion of the airfoil.

6. An apparatus as set forth in claim 1 wherein said forming tool includes a plurality of cutting teeth mounted in a circular array, said apparatus further including drive means for rotating said circular array of cutting teeth about the central axis of said forming tool as said forming tool and airfoil move relative to each other.

7. An apparatus as set forth in claim 6 wherein said means for varying the angular orientation of the central axis of said forming tool includes means for moving said forming tool about a secondary axis extending transversely to the axis of rotation of the circular array of cutting teeth to change the angular orientation of the axis of rotation of the circular array of cutting teeth relative to the straight line extending between opposite ends of the arcuately bowed edge portion of the airfoil and maintain a substantially constant relationship between the circular array of cutting teeth and the edge portion of the airfoil as said forming tool and airfoil move relative to each other.

8. An apparatus as set forth in claim 1 further including positioning means for engaging a major side surface of the airfoil adjacent to said forming tool to at least partially position the arcuately bowed edge portion of the airfoil and forming tool relative to each other, and means for rotating the airfoil about its central axis to maintain the major side surface of the airfoil in abutting engagement with said positioning means said forming tool and airfoil move relative to each other.

9. An apparatus for use in shaping at least one of a pair of longitudinally extending edge portions of a longitudinally tapered airfoil having twisted and bowed major side surfaces extending between the longitudinally extending edge portions from a tip portion to a root portion of the airfoil, said apparatus comprising tool means for engaging said one longitudinally extending edge portion of said airfoil, and means for effecting movement between said tool means and the one longitudinally extending edge portion of the airfoil to thereby shape the one longitudinally extending edge portion of the airfoil with said tool means, said means for effecting movement between said tool means and the one longitudinally extending edge portion of the airfoil includes means for moving said tool means along a longitudinally extending path disposed adjacent to the one edge portion of the airfoil and having a length which is at least as great as the distance between the tip and root portions of the airfoil, said means for effecting movement between said tool means and the one longitudinally extending edge portion of the airfoil further including means for compensating for the longitudinal taper of the airfoil by varying the distance between said tool means and a longitudinal central axis of the airfoil during engagement of said tool means with the one longitudinally extending edge portion of the airfoil, means for compensating for the bowed major side surfaces of the airfoil by maintaining a predetermined spatial relationship between an arcuately curved and longitudinally extending axis of the one longitudinally extending edge portion and a central axis of said tool means during engagement of said tool means with the one longitudinally extending edge portion of the airfoil, said means for compensating for the bowed major side surfaces of the airfoil including longitudinally extending cam disposed adjacent to said longitudinally extending path and having a length which is at least as great as the distance between the tip and root portions of the airfoil, and cam follower means disposed in engagement with said cam and connected with said tool means for effecting pivotal movement of said tool means about an axis extending transversely to the arcuately curved and longitudinally extending axis of the one edge portion of the airfoil as said tool means moves along the longitudinally extending path, and means for compensating for twist of the major side surfaces of the airfoil by effecting relative movement between the airfoil and said tool means in a direction transverse to the longitudinal axis of the one longitudinally extending edge portion during engagement of said tool means with the one longitudinally extending edge portion of the airfoil, said means for compensating for twist of the major side surfaces of the airfoil includes a longitudinally extending second cam disposed adjacent to said longitudinally extending path and having a length which is at least as great as the distance between the tip and root portions of the airfoil, and second cam follower means disposed in engagement with said second cam and connected with said tool means for effecting movement of said tool means in a first direction extending transversely to the longitudinally extending path and the one edge portion of the airfoil as said tool means moves along the longitudinally extending path.

10. An apparatus as set forth in claim 9 wherein said means for compensating for taper of the airfoil includes a longitudinally extending third cam disposed adjacent to said longitudinally extending path and having a length which is at least as great as the distance between the tip and root portions of the airfoil, and third cam follower means disposed in engagement with said third cam and connected with said tool means for effecting movement of said tool means in a second direction extending transversely to said first direction and the one edge portion of the airfoil as said tool means moves along the longitudinally extending path.

11. An apparatus for use in shaping an airfoil, said apparatus comprising forming tool means for forming at least one of a pair of longitudinally extending edge portions which extend between offset root and tip portions of an airfoil having twisted major side surfaces, means for moving said forming tool means along a longitudinally extending path disposed adjacent to the airfoil, said path having a length at least as great as the distance between the root and tip portions of the airfoil, means for rotating the airfoil about a longitudinally extending axis disposed between said longitudinally extending edge portions to maintain said one longitudinally extending edge portion of the airfoil and said forming tool means in engagement as said forming tool means moves along the longitudinally extending path, said one longitudinally extending edge portion of the airfoil having an arcuately bowed configuration, said apparatus further including means for supporting said forming tool means for rotation about its central axis as said forming tool means moves along the longitudinally extending path, and means for maintaining the central axis of said forming tool means perpedicular to an arcuately bowed central axis of said one edge portion of the airfoil as said forming tool means moves along the longitudinally extending path.

12. An apparatus as set forth in claim 11 wherein the airfoil has a tapered configuration such that the distance between said longitudinally extending edge portions is different at the root portion of the airfoil than at the tip portion of the airfoil, said apparatus further including means for varying the distance between said forming tool means for varying the distance between said forming tool means and the longitudinal axis of the airfoil as said forming tool means moves along the longitudinally extending path to compensate for the tapered configuration of the airfoil.

13. An apparatus as set forth in claim 11 further including surface means for engaging one major side surface of the airfoil at a location adjacent to said forming tool means as said forming tool means moves along the longitudinally extending path, and means for moving said surface means along the one major side surface of the airfoil as said forming tool moves along the longitudinally extending path.

14. An apparatus as set forth in claim 11 further including surface means disposed in a predetermined position relative to said forming tool means for engaging the airfoil adjacent to said forming tool means to locate said one longitudinally extending edge portion relative to said forming tool means as said forming tool means moves along the longitudinally extending path.

15. An apparatus as set forth in claim 14 wherein said means for rotating the airfoil includes means for pressing the airfoil against said surface means as said tool means moves along the longitudinally extending path.

16. An apparatus for use in shaping an airfoil, said apparatus comprising forming tool means for forming at least one of a pair of longitudinally extending edge portions of an airfoil means for supporting said forming tool means for rotation about a first axis means for moving said forming tool means along a longitudinally extending path adjacent to said one longitudinally extending edge portion of the airfoil, said one longitudinally extending edge portion of said airfoil having an arcuately bowed configuration, locating means disposed adjacent to said forming tool means and movable along the longitudinally extending path with said forming tool means for locating said forming tool means and said one longitudinally extending edge portion of the airfoil relative to each other as said forming tool means moves along the longitudinally extending path, said locating means including a roller having a circular outer surface which is disposed in rolling engagement with a major side surface of the airfoil as said forming tool means moves along the longitudinally extending path and means for supporting said roller for rotation about a second axis extending transversely to said first axis, and means for moving said forming tool means about a third axis extending transversely to said first axis to maintain said first axis in the same angular orientation relative to an arcuately bowed central axis of said one edge portion of the airfoil as the forming tool moves along the longitudinally extending path.

17. An apparatus as set forth in claim 16 wherein said forming tool means includes cutter means for milling said one longitudinally extending edge portion of the airfoil to a predetermined cross sectional configuration, said circular outer surface of said roller being located a predetermined distance from said cutter means to maintain a predetermined spatial relationship between said cutter means and the major side surface of the airfoil as said forming tool means moves along the longitudinally extending path.

18. An apparatus as set forth in claim 16 further including means for pressing the major side surface of the airfoil against the circular outer surface of said roller as said forming tool means moves along the longitudinally extending path.

19. An apparatus as set forth in claim 18 wherein said means for pressing a major side surface of the airfoil against the circular outer surface of said roller includes means for rotating the airfoil about a longitudinally extending axis disposed between the longitudinally extending edge portions of the airfoil, said apparatus further including means for varying the distance between said forming tool means and longitudinally extending axis to compensate for tapering of the major side surface of the airfoil.

20. An apparatus for use in shaping an airfoil, said apparatus comprising forming tool means for forming at least one or a pair of arcuately bowed and longitudinally extending edge portions of an airfoil, means for moving said forming tool means along a longitudinally extending path adjacent to said one arcuately bowed and longitudinally extending edge portion of the airfoil, means for rotating said forming tool means about a first axis as said forming tool means moves along the longitudinally extending path, and means for pivoting said forming tool means about a second axis extending transversely to said first axis to maintain said first axis perpendicular to an arcuately bowed central axis of said one edge portion of the airfoil as said forming tool means moves along the longitudinally extending path.

21. An apparatus as set forth in claim 20 further including locating means disposed adjacent to said forming tool means and movable along the longitudinally extending path with said forming tool means for locating said forming tool means and said one longitudinally extending edge portion of the airfoil relative to each other as said forming tool means moves along the longitudinally extending path.

22. An apparatus as set forth in claim 21 wherein said locating means includes a roller having a circular outer surface which is disposed in rolling engagement with a major side surface of the airfoil as said forming tool means moves along the longitudinally extending path.

23. An apparatus as set forth in claim 21 further including means for supporting said roller for rotation about a third axis extending parallel to said second axis.

24. An apparatus as set forth in claim 21 wherein said forming tool means includes cutter means for milling said one longitudinally extending edge portion of the airfoil to a predetermined cross sectional configuration, said locating means including follower surface means located a predetermined distance from said cutter means for engaging a major side surface of the airfoil to maintain a predetermined spatial relationship between said cutter means and the major side surface of the airfoil as said forming tool means moves along the longitudinally extending path.

25. An apparatus as set forth in claim 21 wherein said forming tool means includes a plurality of cutting teeth disposed in a circular array and means for rotating said cutting teeth about a central axis of said circular array during movement of said forming tool means along the longitudinally extending path, said locating means including surface means for engaging a major side surface of the airfoil adjacent to said circular array of cutting teeth to maintain a predetermined spatial relationship between said circular array of cutting teeth and said one longitudinally extending edge portion of the airfoil as said forming tool means moves along the longitudinally extending path.

26. An apparatus for use in shaping at least one of a pair of longitudinally extending edge portions of a longitudinally tapered airfoil having twisted and bowed major side surfaces extending between and interconnected by the longitudinally extending edge portions from a tip portion to a root portion of the airfoil, said apparatus comprising tool means for engaging said one longitudinally extending edge portion of said airfoil, and means for effecting movement between said tool means and the one longitudinally extending edge portion of the airfoil while maintaining said tool means in engagement with the one longitudinally extending edge portion of the airfoil to thereby shape the one longitudinally extending edge portion of the airfoil with said tool means, said means for effecting movement between said tool means and the one longitudinally extending edge portion of the airfoil including means for compensating for the longitudinal taper of the airfoil by varying the distance between said tool means and a longitudinal central axis of the airfoil during engagement of said tool means with the one longitudinally extending edge portion of the airfoil, means for compensating for the bowed major side surfaces of the airfoil by maintaining a predetermined spatial relationship between an arcuately curved and longitudinally extending axis of the airfoil and said tool means during engagement of said tool means with the one longitudinally extending edge portion of the airfoil, and means for compensating for twist of the major side surface of the airfoil by effecting relative movement between the airfoil and said tool means in a direction transverse to the longitudinal axis of the one longitudinally extending edge portion during engagement of said tool means with the one longitudinally extending edge portion of the airfoil.

27. An apparatus as set forth in claim 26 wherein said means for compensating for the twisted major side surfaces of the airfoil includes means for rotating the airfoil about a longitudinally extending axis disposed between the longitudinally extending edge portions of the airfoil.

28. An apparatus as set forth in claim 27 wherein said tool means includes a forming tool rotatable about its central axis, said means for compensating for the bowed major side surfaces of the airfoil including means for maintaining the central axis of said forming tool perpendicular to the arcuately curved and longitudinally extending central axis of the one longitudinally extending edge portion.

29. An apparatus as set forth in claim 27 wherein said formng tool means includes a plurality of cutting teeth disposed in a circular array about the central axis of said tool means, said means for effecting movement between said tool means and the one longitudinally extending edge portion of the airfoil includes means for moving said forming tool relative to the airfoil along a longitudinally extending path adjacent to the one longitudinally extending edge portion of the airfoil, and means for rotating said circular array of cutting teeth about the central axis of said forming tool as said forming tool moves along the longitudinally extending path.

30. An apparatus as set forth in claim 29 further including surface means for engaging a major side surface of the airfoil adjacent to said circular array of cutting teeth to maintain a predetermined spatial relationship between the circular array of cutting teeth and the one longitudinally extending edge portion of the airfoil as said forming tool moves along the longitudinally extending path.

31. An apparatus as set forth in claim 26 wherein said means for effecting movement between said tool means and the one longitudinally extending edge portion of the airfoil includes means for moving said tool means along a longitudinally extending path disposed adjacent to the one edge portion of the airfoil and having a length which is at least as great as the distance between the tip and root portions of the airfoil, said means for compensating for twist of the major side surfaces of the airfoil including a longitudinally extending cam disposed adjacent to said longitudinally extending path and having a length which is at least as great as the distance between the tip and root portions of the airfoil, and cam follower means disposed in engagement with said cam and connected with said tool means for effecting movement of said tool means in a direction extending transversely to the longitudinally extending path and the one edge portion of the airfoil as said tool means moves along the longitudinally extending path.

32. An apparatus as set forth in claim 26 wherein said means for effecting movement between said tool means and the one longitudinally extending edge portion of the airfoil includes means for moving said tool means along a longitudinally extending path disposed adjacent to the one edge portion of the airfoil and having a length which is at least as great as the distance between the tip and root portions of the airfoil, said means for compensating for the bowed major side surfaces of the airfoil including a longitudinally extending cam disposed adjacent to said longitudinally extending path and having a length which is at least as great as the distance between the tip and root portions of the airfoil, and cam follower means disposed in engagement with said cam and connected with said tool means for effecting pivotal movement of said tool means about an axis extending transversely to the arcuately curved and longitudinally extending axis of the one edge portion of the airfoil as said tool means moves along the longitudinally extending path.

* * * * *

UNITED STATES PATENT OFFICE
CERTIFICATE OF CORRECTION

Patent No. 4,015,509      Dated April 5, 1977

Inventor(s) Eugene J. Malinowski and Raymond J. Zyck

It is certified that error appears in the above-identified patent and that said Letters Patent are hereby corrected as shown below:

Column 10, line 49 after "means" insert --as--.

Column 11, line 17 after "including" insert --a--.

Column 12, line 49 after "axis" insert --,--.

Signed and Sealed this ninth Day of August 1977

[SEAL]

Attest:

RUTH C. MASON
Attesting Officer

C. MARSHALL DANN
Commissioner of Patents and Trademarks